United States Patent Office 3,328,411
Patented June 27, 1967

3,328,411
NOVEL PIPERIDINE DERIVATIVES
Joachim Borck, Karl Schulte, Helmut Müller-Calgan, and Siegmund Sommer, Darmstadt, Germany, assignors to E. Merck Aktiengesellschaft, Darmstadt, Germany
No Drawing. Filed Dec. 4, 1964, Ser. No. 416,133
Claims priority, application Germany, Dec. 7, 1963, M 59,180
8 Claims. (Cl. 260—293)

This invention relates to the preparation of novel piperidine derivatives, particularly to those having an effect on the nervous system of mammals.

Thus, the principal object of this invention is to provide novel piperidine derivatives.

Another object is to provide processes for their preparation.

Further aspects of this invention include pharmaceutical compositions and methods of administration, based on the novel derivatives of this invention.

Upon further study of the specification and claims, other objects and advantages of the present invention will become apparent.

To attain the objects of this invention, there are provided compounds of Formula I, as follows.

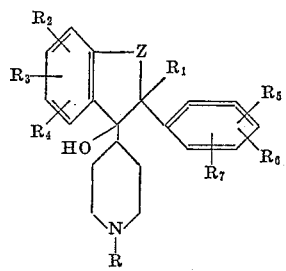

wherein

Z represents sulfur or $(-CH_2-)_n$ ($n=1$, 2, or 3), and
R and $R_1$, being identical or different, represent hydrogen, alkyl of 1–4 carbon atoms, or benzyl,
$R_2$, $R_3$, $R_4$, $R_5$, $R_6$, and $R_7$, being identical or different, represent hydrogen; alkyl, alkoxy or alkylthio groups of 1–4 carbon atoms, respectively; a trifluoromethyl group; fluorine, chlorine, or bromine; and two of $R_2$ through $R_7$ on one ring can be represented by a methylene dioxy group;
with the provisions that at least three of $R_2$ through $R_7$ represent hydrogen, and not more than four of $R_2$ through $R_7$ represent a halogen.

Also provided are their dehydration derivatives, quaternary amines, and N-oxide compounds, as well as the acid addition salts thereof.

These compounds exhibit good compatibility, remarkable narcosis-potentiating and/or central depressant (tranquilizing, sedative, hypnotic) and/or thymoleptic and/or spasmolytic and/or antihistaminic properties.

The process of preparing the novel compounds of this invention comprises reacting a ketone of Formula II,

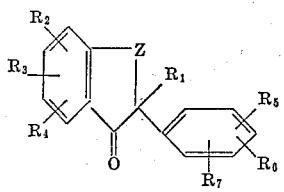

wherein $R_1$–$R_7$ and Z have the previously indicated significance, in a conventional manner with an organometallic compound of Formula III

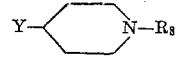

wherein

Y represents an alkali metal (preferably lithium), MgX, CdX, or ZnX,
X represents chlorine, bromine, or iodine, and
$R_8$ represents alkyl of 1–4 carbon atoms, benzyl, or any residue which can be replaced by hydrogen via solvolysis or hydrogenolysis, to form the corresponding tertiary alcohols of Formula I wherein R has the same meaning as $R_8$.

The process further comprises, if desired, treating the thus-obtained alcohol in any desired sequence of additional steps. The alcohol can thus be dehydrated with dehydrating agents and/or the residue affixed to the nitrogen atom can be replaced by hydrogen by solvolysis or hydrogenolysis, with the formation of the corresponding compounds of Formula I wherein R represents hydrogen, or with the formation of the corresponding compounds of Formulas IV or V, respectively, having an olefinic double bond:

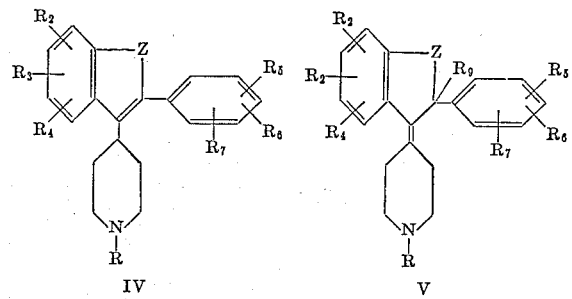

wherein Z and R–$R_7$ have the previously indicated meanings; and $R_9$ represents alkyl of 1–4 carbon atoms, or benzyl.

If desired, a hydrogen atom affixed to the nitrogen atom can be subsequently replaced by the residue $R_8$ by conventional alkylation; and/or the tertiary amines corresponding to Formulas I, IV, or V can be quaternized by the introduction of a lower alkyl of 1–4 carbon atoms or benzyl, or they can be N-oxidized with an N-oxidation agent, such as a peracid or hydrogen peroxide. Still further, secondary or tertiary amines of Formulas I, IV, or V, or their N-oxides, can be converted into their acid addition salts.

The reaction of a ketone of Formula II with an organometallic compound of Formula III is suitably conducted in an inert solvent, such as ether, anisole, dibenzyl ether, dioxane, benzene, toluene, methylene chloride, or preferably tetrahydrofuran, if desired with the addition of a Lewis acid suitable for complex formation, such as, for example, magnesium bromide. Suitably, the ketone is added as a solution, or in the solid state, to a solution of the organometallic compound in one of the above-mentioned solvents. The reaction is normally exothermic, the reaction temperature preferably ranging between $-20°$ C. and $+70°$ C. To complete the reaction, the reaction mixture can be further heated at a temperature limited by the boiling point of the solvent used.

After the preceding reaction is terminated, the reaction product is hydrolyzed, if desired, after the solvent has been evaporated and recovered. The hydrolysis is conducted under acidic conditions, for example, with the aid of aqueous ammonium chloride or 1 N hydrochloric acid.

The tertiary alcohols can be isolated by treating with solvents, such as ether, ethyl acetate, chloroform, or methylene chloride. In this manner, the desired tertiary alcohols of Formula I containing the residue $R_8$ in place of the residue R are obtained, either directly or after the acidic solution has first been made alkaline.

As starting materials of Formula II, ketones of the following formulas can be advantageously used:

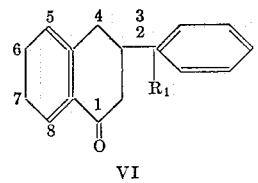 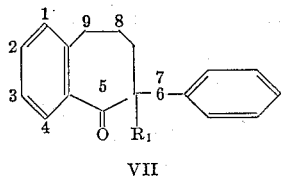

VI              VII (a)

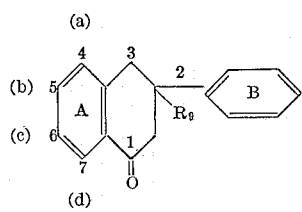 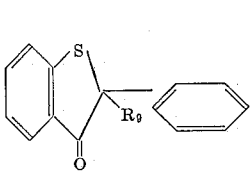

(b)
(c)
(d)

VIII           IX wherein the aromatic rings are not substituted, $R_1$ has the above-indicated meaning, and is preferably hydrogen, methyl, or ethyl, and $R_9$ has the previously indicated meaning and is preferably methyl or ethyl;

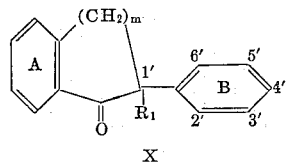 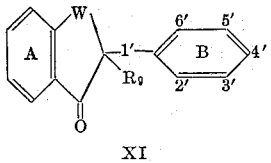

X            XI wherein $m$ can be 2 or 3, and W can be $CH_2$ or S, and $R_1$ and $R_9$, respectively, have the previously set forth meaning; the aromatic rings designated by A are unsubstituted, and the benzene rings designated by B can be substituted in any desired position by identical or different residues, such as 1–2 alkyl groups of 1–4 carbon atoms, preferably by 1–2 methyl groups and/or by 1–2 alkoxy groups of 1–4 carbon atoms, preferably methoxy or ethoxy groups and/or by 1–2 fluorine, chlorine, or bromine atoms, or by 3 vicinal methoxy groups, with the condition that the entire number of the substituents is no larger than 3, or the rings B carry an alkylthio group of 1–4 carbon atoms, particularly methyl or ethylthio groups, or a 3′,4′-methylenedioxy group, or a trifluoromethyl group;

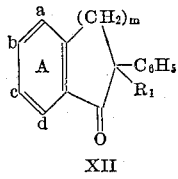 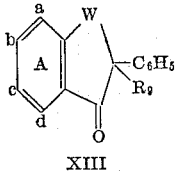

XII           XIII wherein $m$, W, $R_1$, and $R_9$ have the previously indicated meanings, but preferably $m=2$ and $W=CH_2$; the phenyl residues are unsubstituted; and the aromatic rings A can be substituted in the positions designated by $a$, $b$, $c$, and $d$ by identical or different residues, such as 1–2 alkyl groups of 1–4 carbon atoms, preferably by 1–2 methyl groups and/or by 1–2 alkoxy groups of 1–4 carbon atoms, particularly methoxy or ethoxy groups, and/or by one fluorine or bromine atom or 1–2 chlorine atoms, respectively, providing that the number of the substituents is no more than 2, as well as ketones of Formulas XII and XIII ($W=CH_2$) wherein the positions $a$, $b$, or $c$ can be substituted respectively by one alkylthio group of 1–4 carbon atoms, preferably methyl or ethylthio groups, or by a trifluoro-methyl group, or by a methylenedioxy group, the latter being particularly preferred in positions $b$ and $c$, or by 3 vicinal methoxy groups;

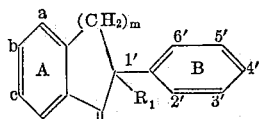 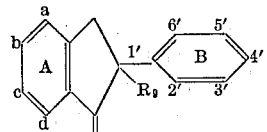

XIV           XIVa wherein $R_1$, $R_9$, and $m$ have the previously indicated meanings, and both aromatic rings can be substituted in the manner set forth in connection with Formulas X through XIII, with the condition that both aromatic rings together do not possess more than 3 substituents.

Particularly preferred specific ketones which can be used as starting materials are as follows:

2-phenyl-tetralone-(1);
2-methyl- (or 2-ethyl-,
2-n-propyl,
2-isopropyl-,
2-n-butyl-,
2-sec. butyl-,
2-isobutyl-,
2-tert. butyl-,
2-benzyl-) -2-phenyl-tetralone-(1);
6-phenyl-benzosuberone;
6-methyl- (or 6-ethyl-,
6-propyl-,
6-isopropyl-,
6-n-butyl-,
6-sec. butyl-,
6-isobutyl-,
6-tert. butyl-,
6-benzyl-) -6-phenyl-benzosuberone;
2-phenylindanone-(1);
2-methyl- (or 2-ethyl,
2-propyl-,
2-isopropyl-,
2-n-butyl-,
2-sec. butyl-,
2-isobutyl-,
2-tert. butyl-,
2-benzyl-) -2-phenyl-indanone-(1);
2-methyl-2-phenyl-2,3-dihydrothionaphthen-3-one;
2-n-propyl- (or 2-ethyl-,
2-isopropyl-,
2-n-butyl-) -2-phenyl-2,3-dihydro-thionaphthen-3-one;
2-(o-chlorophenyl)-tetralone-(1);
2-(m-chlorophenyl)- [or 2-(p-chlorophenyl-,
2-(3′,4′-dichlorophenyl)-,
2-(2′,4′-dichlorophenyl)-,
2-(o-methoxyphenyl)-,
2-(m-methoxyphenyl)-,
2-(p-methoxyphenyl)-,
2-(3′,4′-dimethoxyphenyl)-,
2-(3′,4′,5′-trimethoxyphenyl)-,
2-(3′,4′-methylenedioxyphenyl)-,
2-(p-ethoxyphenyl)-,
2-(p-butoxyphenyl)-,
2-(o-tolyl)-,
2-(m-tolyl)-,
2-(p-tolyl)-,
2-(2′,4′,-dimethylphenyl)-,
2-(o-ethylphenyl)-,
2-(p-bromophenyl)-,
2-(o-fluorophenyl)-,
2-(p-trifluoromethylphenyl)-,
2-(p-methylmercaptophenyl)-,
2-(p-ethylmercaptophenyl)-] -tetralone-(1);
6-(o-fluorophenyl)-benzosuberone;
6-(m-chlorophenyl)-benzasuberone;
2-(o-methoxyphenyl)-2-methyl-tetralone-(1);
2-ethyl-2-(m-chlorophenyl)-tetralone-(1);

6-(m-chlorophenyl)-6-methyl-benzosuberone;
6-(p-methoxyphenyl)-6-methyl-benzosuberone;
2-methyl-2-(o-tolyl)- [ or 2-methyl-2-(m-tolyl)-,
2-methyl-2-(p-tolyl)-,
2-ethyl-2-(2',4'-dimethylphenyl)-] -indanone-(1);
2-(m-chlorophenyl)-2-methyl- [or 2-p-chlorophenyl)-2-methyl,
2-(o-chlorophenyl)-2-methyl-,
2-methyl-2-(o-tolyl)-,
2-methyl-2-(p-tolyl)-,
2-(p-methoxyphenyl)-2-methyl-] -2,3-dihydrothio-naphthen-3-one;
5,8-dimethyl-2-phenyl-tetralone-(1);
5-chloro-2-phenyl- (or 6-chloro-2-phenyl-,
7-chloro-2-phenyl-,
7-bromo-2-phenyl-,
2-phenyl-7-trifluoromethyl-,
6,7-dimethoxy-2-phenyl-,
6-methoxy-2-phenyl-,
7-methoxy-2-phenyl-,
5-fluoro-2-phenyl-,
5-methyl-2-phenyl-,
7-methylmercapto-2-phenyl-,
7-ethylmercapto-2-phenyl-,
7-methyl-2-phenyl-,
7-tert. butyl-2-phenyl-,
6,7-methylenedioxy-2-phenyl-)-tetralone-(1);
5-chloro-2-methyl-2-phenyl- (or 6-chloro-2-methyl-2-phenyl-,
7-chloro-2-methyl-2-phenyl-,
2-n-butyl-5-chloro-2-phenyl-) -tetralone-(1);
1-chloro-6-phenyl- (or 3-methoxy-6-phenyl,
2-chloro-6-phenyl-) -benzosuberone;
6-ethyl-3-trifluoromethyl-6-phenyl-benzosuberone;
4-fluoro-2-methyl-2-phenyl- (or 5-methoxy-2-methyl 2-phenyl-,
4,7-dimethyl-2-phenyl-) -indanone-(1);
6-chloro-2,4-dimethyl-2-phenyl-2,3-dihydro-thio-naphthen-3-one;
6-ethoxy-2-methyl-2-phenyl- (or 5,7-dichloro-2-methyl-2-phenyl-,
5-bromo-2-methyl-2-phenyl-,
6-chloro-2-methyl-2-phenyl-) 2,3-dihydrothio-naphthen-3-one;
5,2'-dichloro- (or 6-methoxy-2'-methyl-,
3'-chloro-7-trifluoromethyl-,
2',5,8-trimethyl-,
3'-chloro-5-methyl-) -2-phenyl-tetralone-(1);
2-ethyl-4'-ethoxy-5-fluoro- (or 2-ethyl-7-methoxy-4',5'-methylenedioxy-) -2-phenyl-tetralone-(1); and
4'-bromo-6-methoxy-2-methyl- (or 4'-ethylmercapto-2,4-dimethyl-,
2'-methoxy-2,6-dimethyl-,
2-n-butyl-2',4'-dichloro-5-methoxy-) -2-phenyl-indanone-(1).

As the organometallic compounds of Formula III, preferably the corresponding magnesium-organic compounds are utilized, particularly compounds of the type

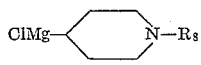

$R_8$ can represent, in addition to methyl, ethyl, n-propyl, isopropyl, n-butyl, isobutyl, sec. butyl, and tert. butyl, any other residue which is replaceable by hydrogen by a solvolysis or hydrogenolysis, such as, for example, benzyl or substituted benzyl, such as o-, m-, or p-methylbenzyl, o-, m,- or p-methoxybenzyl, or naphthylmethyl.

In the tertiary alcohols of Formula I which are obtained during the reaction of ketones of Formula II with organometallic compounds of Formula III, a residue present at the nitrogen atom and replaceable by hydrogen by solvolysis or hydrogenolysis can be so replaced by hydrogen (as described, for example, in Houben-Weyl, "Methoden der organischen Chemie" [Methods of Organic Chemistry], Georg Thieme Publishers, Stuttgart, Germany, volume 11/1, 1957, pages 968–988). The hydrogenolysis can be conducted by treating the tertiary amine of Formula I with catalytically activated hydrogen. Conventional hydrogenation catalysts can be used, such as, for example, noble metal catalysts, Raney nickel or Raney cobalt. These catalysts can be in the form of oxide catalysts, carrier catalysts, such as palladium-animal charcoal, or in the form of finely divided metal catalysts, such as palladium black. The process is preferably carried out under increased pressure, as well as, if desired, at increased temperature. Furthermore, it is advantageous to conduct the reaction in the presence of an inert solvent, for example in the presence of ethanol. The tertiary amine of Formula I in the form of its acid addition salts can also be hydrogenated in aqueous solution.

If it is desired to replace the substitutent by hydrogen by solvolysis, the tertiary amine of Formula I (R representing a residue replaceable by hydrogen solvolytically) can be treated with chloro-formic acid esters, for example, and subsequently the urethane obtained in this manner can be hydrolytically decomposed, preferably in an aqueous-acidic or aqueous-alkaline medium. By this method, it is sometimes possible, if somewhat stricter conditions are maintained, to obtain the corresponding dehydration products of Formulas IV and V directly.

In the manner described above, tertiary alcohols of Formula I are obtained, but preferably those of the following formulas:

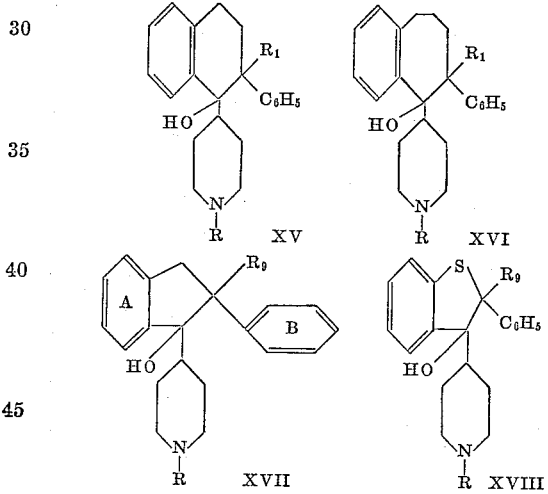

wherein the aromatic rings are not substituted, and R, $R_1$, as well as $R_9$ have the above-indicated meanings, R and $R_1$ preferably representing hydrogen, methyl, or ethyl, and $R_9$ preferably representing methyl or ethyl;

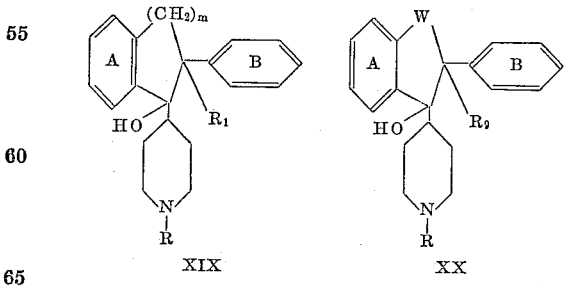

wherein R, $R_1$, $R_9$, m, and W have the above-mentioned meanings and carry substituents either at ring B or at ring A, as set forth in connection with Formulas X to XIII; furthermore, carbinols of Formulas XVII and XIX in which both aromatic rings are substituted as set forth in connection with Formulas XIV and XIVa; R and $R_1$ have the previously indicated meanings, but represent preferably hydrogen, methyl, or ethyl; $R_9$ represents, of the above-mentioned possibilities, preferably methyl or ethyl; and m is 2 or 3.

The carbinols of Formula I obtained in accordance with the invention can be dehydrated (if desired, after previously removing a substituent present at the nitrogen, by hydrogenolysis or solvolysis, or by removing this substituent by hydrogenolysis or solvolysis at the same time the dehydration process takes place). Such a dehydration can be conducted by heating a carbinol of Formula I with aqueous, ethanolic, or isopropanolic hydrochloric acid. The dehydration can also be accomplished with other dehydrating agents, such as phosphorus oxychloride, sulfuric acid, zinc chloride, potassium bisulfate, aqueous or alcoholic hydrobromic acid, or by the use of chemically equivalent dehydration processes.

If, as the starting material, a carbinol of Formula I is used wherein $R_1$ represents hydrogen, compounds of Formula IV are obtained by means of the dehydration. If those carbinols are used as starting point in which $R_1$ has the meaning of $R_9$, compounds of Formula V are obtained by the dehydration.

It is not necessary to isolate the primarily obtained carbinol of Formula I for producing the compounds of Formulas IV and V. It is possible, for example, to conduct the reaction of the organometallic compounds III with the ketones II under more severe reaction conditions, for example at somewhat increased temperatures, particularly if a higher boiling solvent, for example toluene, is used for the reaction; and/or the acidic hydrolysis step following the organometallic reaction can be conducted, if desired, under more severe reaction conidtions, for example, with heating. In this case, the desired olefins of Formulas IV and V, respectively, are obtained directly.

In order to produce the olefins of Formulas IV and V, respectively, in which R=H, the corresponding carbinol of Formula I (R=H) does not have to be isolated. Rather, it is also possible to convert the carbinol I (R=hydrogen-olytically or solvolytically separable residue) under simultaneous water liberation and replacement of the residue R by hydrogen in the olefins of Formulas IV and V, respectively (R=H). This can be done, for example, by treating the acidic aqueous solution of such carbinols at increased temperature with catalytically activated hydrogen, or by acidifying and heating the reaction solution after hydrogenolysis is conducted under gentle conditions, or by conducting the solvolytic separation of the residue R, as previously described.

Preferred dehydration products of the following formulas are thus obtainable:

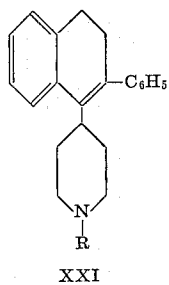
XXI

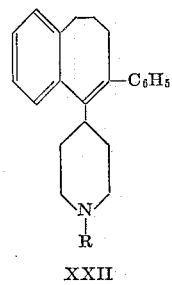
XXII

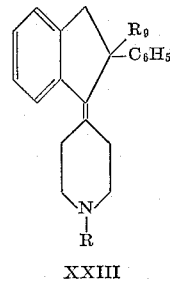
XXIII

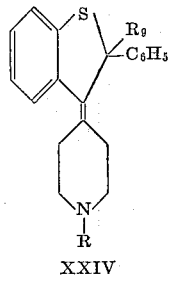
XXIV

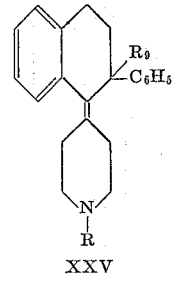
XXV

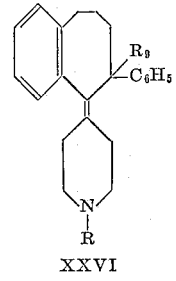
XXVI wherein the aromatic rings are not substituted; and R and $R_9$ have the previously indicated significance, R preferably representing hydrogen, methyl, or ethyl, and $R_9$ preferably representing methyl or ethyl;

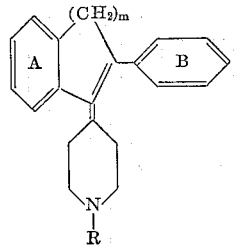
XXVII wherein $m=2$ or 3,

R has the previously indicated meaning and is preferably hydrogen, methyl, on ethyl, and (a) ring B is substituted as indicated in connection with Formula X, or (b) ring A is substituted in the manner indicated for Formula XII, or (c) rings A and B simultaneously carry substituents as indicated for Formula XIV;

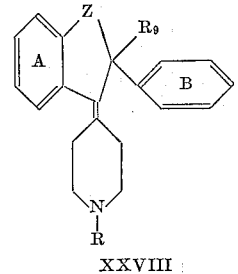
XXVIII wherein

Z, R, and $R_9$ have the previously indicated meanings, R being preferably hydrogen, methyl, or ethyl, and $R_9$ being preferably methyl or ethyl, and (a) ring B is substituted as indicated for Formula XI, or (b) ring A is substituted as stated in connection with Formula XIII, or (c) both rings A and B carry substituents as indicated for Formula XIV.

The olefins corresponding to Formulas IV and V can insofar as they have a residue at the nitrogen atom which can be removed by solvolysis or hydrogenolysis, be converted into the corresponding secondary amines according to the previously described solvolytic or hydrogenolytic methods.

The tertiary alcohols of Formula I or the corresponding olefinic compounds of Formulas IV and V, which are obtainable in accordance with the invention, can be converted into the quaternary salts pertaining thereto by treatment with alkylating agents permitting the introduction of lower alkyl groups of 1–4 carbon atoms or of a benzyl group, respectively. Suitable quaternization agents are alkyl halogenides, such as methyl iodide, ethyl bromide, or dialkyl sulfates, such as dimethyl sulfate, as well as benzyl halogenides, preferably benzyl bromide. The obtained quaternization products correspond to the following formulas:

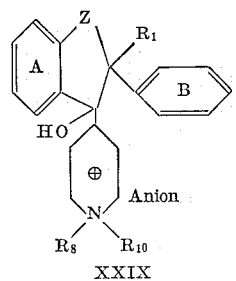
XXIX

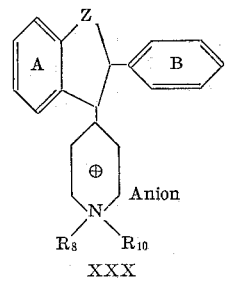
XXX

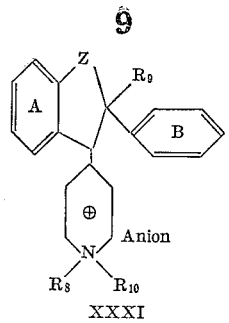

XXXI wherein Z, $R_1$, $R_8$, and $R_9$ have the previously indicated meanings; $R_1$ preferably represents hydrogen, methyl, or ethyl, $R_8$ and $R_9$ preferably represents methyl or ethyl, and $R_{10}$ represents a residue which can be introduced in accordance with known methods regarding the quaternization of tertiary amines, such as a residue being, for example, alkyl or aralkyl, especially methyl, ethyl, n-propyl, n-butyl, or benzyl; the anion is of course negatively charged and is, for example, chloride, bromide, iodide, or alkyl sulfate; and wherein the aromatic rings A and B can be substituted as previously indicated.

Compounds of Formulas I, IV, and V, wherein R represents hydrogen can be converted into the desired tertiary amines wherein R is alkyl of 1–4 carbon atoms or benzyl. Such alkylation reactions are conducted with the use of the same alkylating agents which have been described in the last paragraph in connection with the quaternization. Basically, all methods can be employed for alkylation, which are disclosed, for example, in Houben-Weyl, volume 11/1 (1957), pages 643–656; volume 4 (Third Edition, 1941), pages 643–650.

The N-oxides can also be obtained according to method described in Houben-Weyl, id., volume 11/2 (1958), pages 191–200. They can be obtained, for example, by reaction of the free tertiary bases I, IV, or V with an N-oxidation agent, such as hydrogen peroxide, peracetic acid or Caro's acid (metasulfuric acid). The reaction is advantageously conducted at ambient temperature, or preferably between 50 and 70° C., in the presence of an inert solvent, such as benzene, chloroform, ethyl acetate, methanol, ethanol, or isopropanol. The stoichiometric quantity or an excess of the oxidation agent is employed. After termination of the reaction, any excess oxidation agent can be removed by treating the reaction mixture with a reducing agent, such as platinum dioxide, palladium, Raney nickel, or with hydrosulfites, such as sodium bisulfite.

N-oxides of the following formulas are preferably obtained:

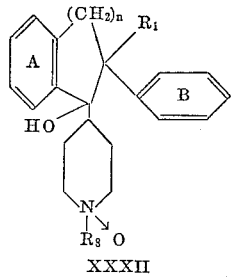
XXXII

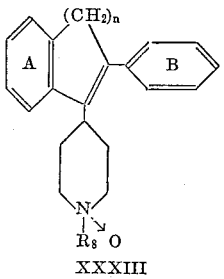
XXXIII

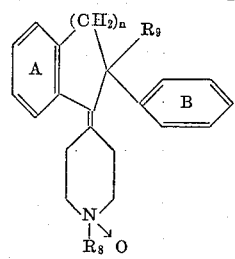

wherein n, $R_1$, $R_8$, and $R_9$ have the previously indicated meanings, $R_1$ representing particularly hydrogen, methyl, or ethyl, $R_8$ and $R_9$ representing preferably methyl or ethyl; and the aromatic rings A and B can be substituted as previously indicated.

The compounds of Formula I can occur as a mixture of stereo-isometric racemates. If desired, these racemates can be separated in the conventional manner by crystallization of their salts or the free bases thereof. Compounds of Formula V can occur in the form of only one racemate. The pure racemates obtained in one manner or another can be split, if desired, into their optical antipodes, for example by reaction with an optically active acid and fractional crystallization of the obtained salts.

Finally, it is possible in accordance with the invention to convert the obtained secondary or tertiary amines of Formulas I, IV, and V, as well as their N-oxides, into acid addition salts by means of conventional treatment with acid. For purposes of this reaction, such acids can be employed which preferably yield physiologically acceptable salts. Thus, organic and inorganic acids can be used, such as, for example, aliphatic, alicyclic, araliphatic, aromatic, or heterocyclic, mono- or polyvalent carboxylic or sulfonic acids, such as formic acid, acetic acid, propionic acid, pivalic acid, diethyl acetic acid, oxalic acid, malonic acid, succinic acid, pimelic acid, fumaric acid, maleic acid, lactic acid, tartaric acid, malic acid, aminocarboxylic acids, sulfamic acid, benzoic acid, salicyclic acid, phenylpropionic acid, citric acid, gluconic acid, ascorbic acid, isonicotinic acid, methanesulfonic acid, ethanedisulfonic acid, β-hydroxy-ethanesulfonic acid, p-tolenesulfonic acid, naphthalene-mono- and disulfonic acids, sulfuric acid, nitric acid, halogen hydraacids, such as hydrochloric acid or hydrobromic acid, or phosphoric acids, such as orthophosphoric acid.

The starting ketones of Formula II required for the processes of the invention can be obtained according to various methods. In case $Z=(CH_2)_n$ or S, and $R_1=H$, these ketones can be obtained, for example, by intramolecular cyclization reactions of α,β-diphenylpropionic acid, α,γ-diphenylbutyric acid, α,δ-diphenylvaleric acid, or α-phenylmercaptomethyl acetic acid, or their analogs, which are substituted in the aromatic rings, or the functional derivatives of these acids. The ketones are obtained in a particularly advantageous way by cyclization of the free acids with polyphosphoric acid.

In case $Z=CH_2$ and $R_1=H$, the ketones II can also be obtained by cyclization of hydroxymethyl-desoxybenzoin or its analogs which are substituted in the aromatic rings, or the corresponding methylene-desoxybenzoins.

In case $Z=S$ and $R_1=H$, the ketones of Formula II can also be obtained, for example, by intramolecular ester-condensation of S-carbalkoxybenzyl-thiosalicylic acid alkyl esters or their nuclear-substituted analogs, and subsequent saponification and decarboxylation of the cyclization products to form 2-phenyl-2,3-dihydro-thionaphthenone-(3) and/or its nuclear-substituted analogs, respectively.

The C-alkylation of the ketones of Formula II $(Z=(CH_2)_n, R_1=H)$ to form ketones of Formula II $(Z=(CH_2)_n, R_1=$alkyl or aralkyl) is done by means of alkyl- or aralkyl-halogenides under the conditions for C-alkylations, as taught, for example, by R. C. Fuson in "Advanced Organic Chemistry," Wiley publishers, New York (1950), pages 418–422, preferably with the use of sodium methylate or ethylate, or potassium tert. butylate as catalysts in solvents such as methanol, ethanol, tert. butanol, benzene, toluene, etc., at temperatures up to the boiling point of the respective solvent which is employed, with practically no simultaneous formation of O-alkylation products.

The C-alkylation of the ketones of Formula II $(Z=S, R_1=H)$ to the ketones II $(Z=S, R_1=$alkyl or aralkyl) is also achieved under the customary C-alkylation conditions, preferably as described in Example 11, with the use of potassium tert. butylate as catalyst. There are obtained mixtures of the C- and O-alkyl- and aralkyl-compounds, respectively, which do not necessarily have to be separated but can be used as such for the Grignard reaction. The O-alkylation products are easily separated, after the reaction with basic Grignard compounds, in the form of neutral compounds.

The organometallic compounds of Formula III which are further necessary as the starting material can be obtained from the basic halogenides or organometallic halogenides, respectively, by treatment with the corresponding metals or metal halogenides.

Preferably, a 4-chloro-N-alkyl- or a 4-chloro-N-aralkyl-piperidine, which are compounds easily obtainable from the corresponding known 4-hydroxy-piperidine derivatives by boiling with thionyl chloride and subsequent distillation of the free bases, is allowed to react with magnesium in tetrahydrofuran or other solvents; at the beginning of the reaction, a small quantity of an alkyl halogenide, such as ethyl bromide, is suitably added and, if necessary, the mixture can also be heated to the boiling point.

The compounds of Formulas IV and V, as well as their acid addition salts, represent a preferred group with regard to their pharmacological effects. The compounds of Formulas XXI, XXIII, and XXIV are distinguished due to their particularly good sedative-hypnotic and thymoleptic effects.

The novel compounds can be employed in mixture with conventional excipients in the human or veterinary medicine. Carrier substances which can be used are such organic or inorganic materials which are suitable for parenteral, enteral, or topical application and which do not react with the novel compounds, such as, for example, water, vegetable oils, polyethylene glycols, gelatine, lactose, amylose, magnesium stearate, talcum, vaseline, cholesterol, etc. For parenteral application, particular solutions are employed, preferably oily or aqueous solutions, as well as suspensions, emulsions, or implants. For enteral application, furthermore, tablets or dragees can be used, for topical application salves or creams are employed which are, if desired, sterilized or mixed with auxiliary substances, such as preservatives, stabilizers, or wetting agents, or with salts for influencing the osmotic pressure, or with buffer substances.

The substances of the invention are preferably used in dosages of 0.1 to 100 mg. per unit dosage.

The $R_F$ values set forth in the following examples refer to the conditions described in Example 5.

Without further elaboration it is believed that one skilled in the art can, using the preceding description, utilize the present invention to its fullest extent. The following preferred specific embodiments are, therefore, to be construed as merely illustrative, and not limitative of the remainder of the specification and claims in any may whatsoever.

EXAMPLE 1

48.6 g. magnesium filings are first mixed with 50 ml. absolute tetrahydrofuran and then, under stirring, with a few crystals of iodine and 5 g. ethyl bromide. At the beginning of the exothermic reaction, a solution of 267 g. 4-chloro-N-methyl-piperidine in 450 ml. absolute tetrahydrofuran is added in such a manner that the temperature is maintained in the range of approximately 50–66° C. Thereafter, the mixture is boiled for 1 hour, cooled to room temperature, and a solution of 222 g. 2-phenyl-tetralone-(1) in 500 ml. absolute tetrahydrofuran added under stirring. The mixture is stirred for 1 hour, left standing overnight, and then the solvent is distilled off, the residue is mixed with acetic acid under ice cooling, is extracted with benzene, and the benzene solution is concentrated by evaporation. About 65% of the initially employed 2-phenyl-tetralone-(1) is recovered.

The acidic aqueous phase is mixed with ammonium chloride and ammonia and extracted with ether. The ether extracts are dried over potassium carbonate, and then they are filtered and concentrated by evaporation. The obtained crude base can be purified by recrystallization from ethanol/water. 70 g. 1-hydroxy-1-(N-methyl-piperidyl-4')-2-phenyltetralin are obtained, M.P. 115–116° C.

Analogously, the following compounds can be produced:

From 2-(o-chlorophenyl)-tetralone-(1), M.P. 71° C.: 1-hydroxy-1-(N-methyl-piperidyl-4')-2-(o-chlorophenyl)-tetralin, M.P. 137–139° C;

From 2-(p-chlorophenyl)-tetralone-(1), M.P. 106° C.: 1-hydroxy-1-(N-methyl-piperidyl-4')-2-(p-chlorophenyl)-tetralin-hydrochloridehydrate, M.P. 128–130° C.;

From 2-phenyl-6-methoxy-tetralone-(1), M.P. 189° C.: 1-hydroxy-1-(N-methyl-piperidyl-4')-2-phenyl-6-methoxy-tetralin, B.P. 220–225° C./0.5 mm.; $R_F$ 0.55;

From 2(p-bromophenyl)-tetralone-(1), M.P. 116° C.: 1-hydroxy-1-(N-methyl-piperidyl)-4')-2 - (p-bromophenyl)-tetralin-hydrochloride-dihydrate, M.P. 130–136° C. (decomposition).

Furthermore, the following compounds can be produced from the corresponding 2-aryl-tetralones-(1):

1-hydroxy-1-(N-methyl-piperidyl-4')-2-(o-tolyl)-tetralin, M.P. 146° C.
1-hydroxy-1-(N-methyl-piperidyl-4')-2-(m-tolyl)-tetralin
1-hydroxy-1-(N-methyl-piperidyl-4')-2-(p-tolyl)-tetralin
1-hydroxy-1-(N-methyl-piperidyl-4')-2-(m-chlorophenyl)-tetralin
1-hydroxy-1-(N-methyl-piperidyl-4')-2-(o-fluorophenyl)-tetralin
1-hydroxy-1-(N-methyl-piperidyl-4')-2-(p-fluorophenyl)-tetralin
1-hydroxy-1-(N-methyl-piperidyl-4')-2-(3',4'-dichlorophenyl)-tetralin
1-hydroxy-1-(N-methyl-piperidyl-4')-2-(2',4'-dichlorophenyl)-tetralin
1-hydroxy-1-(N-methyl-piperidyl-4')-2-(o-methoxyphenyl)-tetralin
1-hydroxy-1-(N-methyl-piperidyl-4')-2-(m-methoxyphenyl)-tetralin
1-hydroxy-1-(N-methyl-piperidyl-4')-2-(p-methoxyphenyl)-tetralin
1-hydroxy-1-(N-methyl-piperidyl-4')-2-(3',4'-dimethoxyphenyl)-tetralin
1-hydroxy-1-(N-methyl-piperidyl-4')-2-(3',4',5'-trimethoxy-phenyl)-tetralin
1-hydroxy-1-(N-methyl-piperidyl-4')-2-(3',4'-methylenedioxyphenyl)-tetralin
1-hydroxy-1-(N-methyl-piperidyl-4')-2-(p-ethoxyphenyl)-tetralin
1-hydroxy-1-(N-methyl-piperidyl-4')-2-(p-butoxyphenyl)-tetralin
1-hydroxy-1-(N-methyl-piperidyl-4')-2-(p-methylmercapto-phenyl)-tetralin
1-hydroxy-1-(N-methyl-piperidyl-4')-2-(m-trifluoromethyl-phenyl)-tetralin
1-hydroxy-1-(N-methyl-piperidyl-4')-2-(p-trifluoromethyl-phenyl)-tetralin
1-hydroxy-1-(N-methyl-piperidyl-4')-2-phenyl-5-methyl-tetralin
1-hydroxy-1-(N-methyl-piperidyl-4')-2-phenyl-5-chloro-tetralin
1-hydroxy-1-(N-methyl-piperidyl-4')-2-phenyl-5-fluoro-tetralin
1-hydroxy-1-(N-methyl-piperidyl-4')-2-phenyl-6-chloro-tetralin
1-hydroxy-1-(N-methyl-piperidyl-4')-2-phenyl-7-bromo-tetralin
1-hydroxy-1-(N-methyl-piperidyl-4')-2-phenyl-7-chloro-tetralin
1-hydroxy-1-(N-methyl-piperidyl-4')-2-phenyl-7-methoxy-tetralin
1-hydroxy-1-(N-methyl-piperidyl-4')-2-(p-methoxyphenyl)-6-methoxy-tetralin.

From 2-aryl-tetralones and the corresponding N-substituted 4-chloro-piperidines, there can be produced:

1-hydroxy-1-(N-ethyl-piperidyl-4′)-2-phenyl-tetralin
1-hydroxy-1-(N-propyl-piperidyl-4′)-2-phenyl-tetralin
1-hydroxy-1-(N-isopropyl-piperidyl-4′)-2-phenyl-tetralin
1-hydroxy-1-(N-butyl-piperidyl-4′)-2-phenyl-tetralin
1-hydroxy-1-(N-ethyl-piperidyl-4′)-2-(o-tolyl)-tetralin
1-hydroxy-1-(N-benzyl)piperidyl-4′)-2-phenyl-5-methyl-tetralin.

EXAMPLE 2

32.15 g. 1-hydroxy-1-(N-methyl-piperidyl-4′)-2-phenyl-tetralin are dissolved in 48 ml. 15% isopropanolic hydrochloric acid and heated to the boiling point for 1 hour. After cooling, 1-(N-methyl-piperidyl-4′)-2-phenyl-3,4-dihydronaphthalene-hydrochloride crystallizes out. It is washed with isopropanol and ether and melts at 258–262° C. Yield: 25 g. The accumulated filtrates are concentrated by evaporation; the residue is mixed with caustic soda and shaken out with methylene chloride. The extract is dried, concentrated by evaporation, and the residue is recrystallized from ethanol/water. There are obtained 6.3 g. 1-(N-methyl - piperidyl - 4′)-2-phenyl-3,4-dihydronaphthalene of a melting point of 118–119° C.

The methoiodide is obtained from the base with methyl iodide in ether, M.P. 202–203° C. (from methanol/ether). The chlorobenzylate is obtained by 15 hours' boiling of the base with benzyl chloride in benzene; M.P. 106–107° C. (from acetone/ether).

EXAMPLE 3

32.15 g. 1-hydroxy-1-(N-methyl-piperidyl-4′)-2-phenyl-tetralin are dissolved in 200 ml. 0.1 N hydrochloric acid and heated for one hour to 90–100° C. The solution is cooled, made alkaline by means of caustic soda, the base is extracted with ether, and the ether is dried and concentrated by evaporation. There is obtained a 92% yield of 1 - (N - methyl - piperidyl - 4′) - 2-phenyl-3,4-dihydronaphthalene, M.P. 118–119° C. (from methanol/water).

Analogously, the following compounds are obtained:

From 2 - (o - chlorophenyl) - 1-hydroxy-1-(N-methyl-piperidyl - 4′)-tetralin: 2-(o-chlorophenyl)-1-(N-methyl-piperidyl-4′)-3,4-dihydronaphthalene, M.P. 125–126° C.;

From 2 - (p - chlorophenyl) - 1-hydroxy-1-(N-methyl-piperidyl - 4′) - tetralin: 2(p-chlorophenyl)-1-(N-methyl-piperidyl - 4′) - 3,4 - dihydronaphthalene (hydrochloride, M.P. 280–284° C.);

From 1-hydroxy-6-methoxy-1-(N-methyl-piperidyl-4′)-tetralin: 6 - methoxy - 1-(N-methyl-piperidyl-4′)-3,4-dihydronaphthalene (hydrochloride, M.P. 239–240° C.); and From 2 - (p - bromophenyl) - 1 - hydroxy-1-(N-methyl-piperidyl - 4′)-tetralin: 2-(p-bromophenyl)-1-(N-methyl-piperidyl-4′)-3,4-dihydronaphthalene, M.P. 160–162° C.

EXAMPLE 4

The acidic aqueous phase of Example 1 is boiled for 2 hours, cools, and further processed as described in Example 1. After recrystallization from ethanol/water, the ether residue yields 70 g. 1-(N-methyl-piperidyl-4′)-2-phenyl-3,4-dihydronaphthalene, M.P. 118–119° C.

Analogously, the following compounds can be produced:

From 6 - methoxy-2-(p-methoxyphenyl)-tetralone-(1), M.P. 127° C.: 6-methoxy-2-(p-methoxyphenyl)-1-(N-methyl-piperidyl-4′)-3,4-dihydronaphthalene (hydrochloride, M.P. 249–252° C.);

From 7-bromo-2-phenyl-tetralone-(1), M.P. 103–105° C.: 7-bromo-1-(N-methyl-piperidyl-4′)-2-phenyl-3,4-dihydronaphthalene, M.P. 119–120° C.;

From 7-chloro-2-phenyl-tetralone-(1), M.P. 91° C.: 7-chloro - 1 - (N-methyl-piperidyl-4′)-2-phenyl-3,4-dihydronaphthalene (hydrobromide, M.P. 285–287° C.);

From 5-chloro-2-phenyl-tetralone-(1), M.P. 113–114° C.: 5-chloro-1-(N-methyl-piperidyl-4′)-2-phenyl-3,4-dihydronaphthalene (hydrobromide, M.P. 279–282° C.).

Further, from the corresponding 2-aryl-tetralones:

1-(N-propyl-piperidyl-4′)-2-phenyl-3,4-dihydronaphthalene
1-(N-isopropyl-piperidyl-4′)-2-phenyl-3,4-dihydronaphthalene
1-(N-butyl-piperidyl-4′)-2-phenyl-3,4-dihydronaphthalene
1-(N-isobutyl-piperidyl-4′)-2-phenyl-3,4-dihydronaphthalene
1-(N-sec.butyl-piperidyl-4′)-2-phenyl-3,4-dihydronaphthalene
1-(N-tert.butyl-piperidyl-4′)-2-phenyl-3,4-dihydronaphthalene
1-(N-methyl-piperidyl-4′)-2-(o-tolyl)-3,4-dihydronaphthalene
1-(N-methyl-piperidyl-4′)-2-(m-tolyl)-3,4-dihydronaphthalene
1-(N-methyl-piperidyl-4′)-2-(p-tolyl)-3,4-dihydronaphthalene
1-(N-methyl-piperidyl-4′)-2-(m-chlorophenyl)-3,4-dihydronaphthalene
1-(N-methyl-piperidyl-4′)-2-(o-fluorophenyl)-3,4-dihydronaphthalene
1-(N-methyl-piperidyl-4′)-2-(m-fluorophenyl)-3,4-dihydronaphthalene
1-(N-methyl-piperidyl-4′)-2-(p-fluorophenyl)-3,4-dihydronaphthalene
1-(N-methyl-piperidyl-4′)-2-(2′,4′-dichlorophenyl)-3,4-dihydronaphthalene
1-(N-methyl-piperidyl-4′)-2-(3′,4′-dimethoxyphenyl)-3,4-dihydronaphthalene
1-(N-methyl-piperidyl-4′)-2-(p-methylmercaptophenyl)-3,4-dihydronaphthalene
1-(N-methyl-piperidyl-4′)-2-(p-ethylmercaptophenyl)-3,4-dihydronaphthalene
1-(N-methyl-piperidyl-4′)-2-(m-trifluoromethylphenyl)-3,4-dihydronaphthalene
1-(N-methyl-piperidyl-4′)-2-(p-trifluoromethylphenyl)-3,4-dihydronaphthalene
1-(N-ethyl-piperidyl-4′)-2-(o-tolyl)-3,4-dihydronaphthalene
1-(N-butyl-piperidyl-4′)-2-(m-chlorophenyl)-3,4-dihydronaphthalene
6-chloro-1-(N-methyl-piperidyl-4′)-2-phenyl-3,4-dihydronaphthalene
5-methyl-1-(N-methyl-piperidyl-4′)-2-phenyl-3,4-dihydronaphthalene
5,8-dimethyl-1-(N-methyl-piperidyl-4′)-2-phenyl-3,4-dihydronaphthalene
7-methoxy-1-(N-methyl-piperidyl-4′)-2-phenyl-3,4-dihydronaphthalene
7-ethoxy-1-(N-methyl-piperidyl-4′)-2-phenyl-3,4-dihydronaphthalene
5-fluoro-1-(N-methyl-piperidyl-4′)-2-phenyl-3,4-dihydronaphthalene
5-methoxy-1-(N-methyl-piperidyl-4′)-2-phenyl-3,4-dihydronaphthalene
6-methyl-1-(N-methyl-piperidyl-4′)-2-phenyl-3,4-dihydronaphthalene
7-methyl-1-(N-methyl-piperidyl-4′)-2-phenyl-3,4-dihydronaphthalene
5,7-dichloro-1-(N-methyl-piperidyl-4′)-2-phenyl-3,4-dihydronaphthalene
7-bromo-1-(N-methyl-piperidyl-4′)-2-(p-bromophenyl)-3,4-dihydronaphthalene
1-(N-ethyl-piperidyl-4′)-5-chloro-2-phenyl-3,4-dihydronaphthalene
2-methyl-1-(N-methyl-piperidylidene-4′)-2-phenyl-tetralin
2-ethyl-1-(N-methyl-piperidylidene-4′)-2-phenyl-tetralin
2-methyl-1-(N-benzyl-piperidylidene-4′)-2-phenyl-tetralin
2-ethyl-1-(N-benzyl-piperidylidene-4′)-2-phenyl-tetralin
7-chloro-2-methyl-1-(N-methyl-piperidylidene-4′)-2-phenyl-tetralin 2-ethyl-2-(o-chlorophenyl)-1-(N-methyl-piperidylidene-4')-tetralin.

EXAMPLE 5

1 - hydroxy-1-(N-methyl-piperidyl-4')-2-phenyl-tetralin (A) (Example 1) and 1-(N-methyl-piperidyl-4')-2-phenyl-3,4-dihydronaphthalene (B) (Example 2) can be separated chromatographically as follows: About 5–100 micrograms of the bases in alcoholic or ethereal solution are spread onto a thin-film chromatographic plate coated with silica gel, and the developing process is carried out at 20° C. in a mixture of cyclohexane:diethylamine:petroleum ether (1:1:8). In order to produce visibility, the plate is sprayed with a solution of antimony pentachloride in carbon tetrachloride. The $R_F$ value of the 3,4-dihydronaphthalene derivative (B) is of the order of 0.7, the $R_F$ value of the tetralol derivative (A) is of the order of 0.35.

By the just described chromatographic technique, further dehydrating methods can be examined quickly and accurately as to their comparative usefulness. Thus, it is found that A is quantitatively dehydrated to B, mostly without the formation of by-products, under the following conditions:

(a) 3.2 g. A are boiled for one hour in 10.5 g. 36% hydrochloric acid and 36 g. glacial acetic acid.

(b) 3.2 g. A are heated for one hour to 80–90° C. in 20 ml. 35% hydrochloric acid.

(c) 2 g. A are boiled for one hour in 20 ml. toluene with 0.5 g. p-toluene sulfonic acid, using a water trap.

(d) 2 g. A are boiled for half an hour in 20 ml. toluene with 1 g. phosphorus pentoxide.

(e) 3.2 g. A are heated for one hour to 50–70° C. in 20 ml. freshly distilled phosphorus oxychloride.

(f) 2 g. A are boiled for one hour in 25 ml. chloroform with the addition of 1 g. acetyl chloride.

(g) 3.2 g. A are dissolved in 20 ml. isopropanol; 40% aqueous hydrobromic acid is added up to a pH of about 1.8; and the mixture is boiled for one hour.

(h) 10 g. A are heated for one hour to 150–170° C. with 20 g. potassium bisulfate, under frequent stirring.

(i) 10 g. A are heated for one hour to 140–160° C. with 9 g. oxalic acid dihydrate.

EXAMPLE 6

24.5 g. 2-methyl-2-phenyl-indanone-(1) are reacted with a Grignard reagent of 5.5 magnesium and 30 g. 4-chloro-N-methyl-piperidine, as in Example 1, and the reaction mass is then worked up. There are obtained, after recrystallization from dimethyl formamide/water, 29.5 g. 1 - hydroxy-1-(N-methyl-piperidyl-4')-2-methyl-2-phenyl-indane, M.P. 205° C. (sintering at 190° C.).

Analogously, the following compounds can be produced.

From 2-ethyl-2-phenyl-indanone-(1) and 2-n-butyl-2-phenyl-indanone-(1) (B.P. 158–160° C./0.05 mm.) and 2-benzyl-2-phenyl-indanone-(1) (M.P. 145° C.), respectively:

2-ethyl-1-hydroxy-1-(N-methyl-piperidyl-4')-2-phenyl-indane, B.P. 226–228° C./0.5 mm.;

2-n-butyl-1-hydroxy-1-(N-methyl-piperidyl-4')-2-phenyl-indane, B.P. 220–225° C./0.02 mm.; and 2-benzyl-1-hydroxy-1-(N-methyl-piperidyl-4')-2-phenyl-indane, M.P. 248–251° C. (from dimethyl formamide/ethanol).

Furthermore, the following compounds are analogously obtainable from the corresponding 4-chloropiperidines and 2-aryl-indanones-(1):

1-(N-ethyl-piperidyl-4')-1-hydroxy-2-methyl-2-phenyl-indane 2-(o-chlorophenyl)-1-hydroxy-2-methyl-1-(N-methyl-piperidyl-4')-indane 2-(m-chlorophenyl)-1-hydroxy-2-methyl-1-(N-methyl-piperidyl-4')-indane 2-(p-chlorophenyl)-1-hydroxy-2-methyl-1-(N-methyl-piperidyl-4')-indane 2-(o-tolyl)-1-hydroxy-2-methyl-1-(N-benzyl-piperidyl-4')-indane 4-chloro-1-hydroxy-2-methyl-1-(N-methyl-piperidyl-4')-2-phenyl-indane 1-hydroxy-6-methoxy-2-methyl-1-(N-methyl-piperidyl-4')-2-phenyl-indane 4-chloro-2-(o-chlorophenyl)-1-hydroxy-2-methyl-1-(N-methyl-piperidyl-4')-indane 1-hydroxy-6-methoxy-2-methyl-1-(N-methyl-piperidyl-4')-2-(o-tolyl)-indane.

EXAMPLE 7

(a) 150 g. 1 - hydroxy - 1 - (N - methyl - piperidyl-4')-2-methyl-2-phenyl-indane are dissolved in 500 ml. 12% isopropanolic hydrochloric acid and 200 ml. isopropanol, and boiled for one hour. The hydrochloride which crystallizes during cooling is removed by suction and recrystallized from isopropanol. Yield: 140 g. 2-methyl - 1 - (N - methyl - piperidylidene - 4') - 2 - phenyl-indane-hydrochloride, M.P. 245° C.

(b) 27 g. 1 - hydroxy - 1 - (N - methyl - piperidyl-4')-2-methyl-2-phenyl-indane are heated with 54 g. potassium bisulfate for 2 hours to 180° C. and ¼ hour to 240° C. The product is cooled, dissolved in water, and made alkaline by means of caustic soda solution; it is then shaken out with ether, and the extracts are dried over potassium carbonate, concentrated, and the residue is distilled. Boiling point: 203–204° C./0.2 mm. Yield: 22 g. 2 - methyl - 1 - (N - methyl - piperidylidene - 4') - 2-phenyl-indane.

Analogously, the following compounds can be produced from the carbinol bases of Example 6:

2-ethyl-1-(N-methyl-piperidylidene-4')-2-phenyl-indane, B.P. 205–207° C./0.5 mm.;

2-n-butyl-1-(N-methyl-piperidylidene-4')-2-phenyl-indane, B.P. 225–228° C./1–2 mm.; and 2-benzyl-1-(N-methyl-piperidylidene-4')-2-phenyl-indane, B.P. 210–215° C./0.05 mm. (p-toluene-sulfonate, M.P. 247–248° C.).

EXAMPLE 8

A mixture of 5.7 g. magnesium, 31.3 g. 4-chloro-N-methyl-piperidine, 200 ml. absolute ether, 1–2 g. ethyl bromide, and 20 ml. tetrahydrofuran is boiled for 2 hours. To this mixture is added by pouring under stirring a solution of 29.5 g. 6-methoxy-2-methyl-2-phenyl-indanone-(1) (M.P. 65° C.) in 150 ml. absolute ether. The mixture is boiled for 4 hours, cooled, and hydrochloric acid is added. The ether phase is separated, and the remaining aqueous phase is mixed, under cooling, with ammonium chloride and ammonia until a strongly alkaline reaction occurs. The bases are extracted by ether, and the extracts are dried; the ether is removed by evaporation, and the residue is recrystallized fro mdimethyl formamide/water and dried. The obtained racemate mixture of the stereoisomeric 1 - hydroxy - 6 - methoxy - 2 - methyl - 1 - (N-methyl-piperidyl-4')-2-phenyl-indanes melts at 165–173° C. and boils at 231–234° C./1 mm. In the chromatogram, the thus-obtained mixture is separated in two spots having the $R_F$ of 0.32 and 0.48.

EXAMPLE 9

35 g. 1 - hydroxy - 6 - methoxy - 2 - methyl - 1 - (N-methyl-piperidyl-4')-2-phenyl-indane (racemate mixture) are heated for 1½ hours to 50–70° C. in 200 ml. freshly distilled phosphorus oxychloride; the phosphorus oxychloride is distilled off under decreased pressure, and the residue is mixed with icewater and, under cooling, with aqueous caustic soda solution. The base is extracted with ether, the extract is dried and concentrated by evaporation. There are obtained 31 g. 6-methoxy-2-methyl-1-(N-methyl-piperidylidene-4')-2-phenyl-indane, B.P. 229–231° C./0.1 mm.

31 g. of the distillate are dissolved in 105 ml. 2 N acetic acid, and a solution of 6 g. sodium chloride in 30 ml. water is added. The obtained hydrochloride-monohydrate of the base is recrystallized from ethanol/water. Yield: 27.5 g., M.P. 149–151° C.; $R_F$ 0.55.

EXAMPLE 10

2.5 g. magnesium-copper alloy having 12.75% copper are covered with 10 ml. dry ether; and 0.5 ml. methyl iodide, 7:5 g. magnesium filings, and 20 ml. tetrahydrofuran are added. Then, a solution of 53.5 g. 4-chloro-N-methyl-piperidine in 180 ml. dry ether is added dropwise. The mixture is further boiled for a few hours, cooled, and a solution of 47.3 g. 2-methyl-2-phenyl-tetralone-(1) in 400 ml. dry ether is added dropwise, under stirring. After 20 hours' stirring, the mixture is cooled and mixed with a cold-saturated ammonium chloride solution; the organic layer is separated, the aqueous phase is extracted with ether; and the extracts are dried and concentrated by evaporation. The oily residue distills at 214–215° C./0.8 mm. The hydrochloride of 1-hydroxy-2-methyl-1-(N-methyl-piperidyl-4')-2-phenyl-tetralin, which has been precipitated from an ethereal solution by introducing hydrogen chloride gas and has been crystallized from ethanol/ether, melts at 250° C.

Analogously, the following compounds can be obtained:

1-(N-ethyl-piperidyl-4')-1-hydroxy-2-methyl-2-phenyl-tetralin and
1-(N-benzyl-piperidyl-4')-1-hydroxy-2-methyl-2-phenyl-tetralin.

EXAMPLE 11

*Embodiment A.*—72 g. 2-methyl-2-phenyl-2,3-dihydro-thionaphthen-3-one are reacted with Grignard reagent of 15 g. magnesium and 80 g. 4-chloro-N-methyl-piperidine, as in Example 1, and then worked up. The evaporation residue of the alkaline ether extract weighs 71.5 g. and consists of a mixture of the two diastereo-isomeric racemates of 3-hydroxy-2-methyl-3-(N-methyl-piperidyl-4')-2-phenyl-2,3-dihydrothionaphthene. The crude product is recrystallized once from ethyl acetate, is boiled for 1 hour with 300 ml. cyclohexane, and is vacuum filtered while hot from the undissolved portion; the filter cake is recrystallized from isopropanol. There are thus obtained 28 g. pure α-racemate, M.P. 208–210° C., $R_F$ 0.3–0.4.

The cyclohexane filtrate is cooled in an ice bath; the precipitated crystals are removed by suction and recrystallized from isopropanol. Thereby are obtained 15 g. β-racemate, M.P. 155–157° C., $R_F$ 0.6–0.7.

The starting material is provided as follows: 110 g. methyl iodide in 1 liter benzene are added to a mixture of 92 g. 2-phenyl-2,3-dihydro-thionaphthen-3-one and potassium tert. butylate (from 22 g. potassium) in 1.5 liter benzene, this being done at 20–30° C.; the mixture is stirred for 2 hours at room temperature, is boiled for 3 hours, is mixed with water, and is acidified with acetic acid. The benzene phase is separated and admixed to a dilute sodium hydroxide solution; the benzene is distilled off, and the residue is distilled at 160–165° C./0.1 mm. There are thus obtained 90.5 g. of a mixture (G) of 2-methyl-2-phenyl-2,3-dihydro-thionaphthen-3 - one and 1-methoxy-2-phenyl-thionaphthene.

By crystallization from isopropanol, 40–45 g. ketone are obtained therefrom, M.P. 96–97° C.

*Embodiment B.*—The reaction is conducted as described in connection with A, but instead of the pure 2-methyl-2-phenyl-2,3-dihydro-thionaphthen-3-one, 105 g. of mixture G are employed. The compound 1-methoxy-2-phenyl-thionaphthene does not participate in the Grignard reaction and is separated from the basic reaction products in working up the acidic ether extract.

Analogously, the following compounds are obtained from the corresponding 2-aryl-2,3-dihydro-thionaphthenones-(3) and 4-chloropiperidines:

2-ethyl-2-phenyl-3-hydroxy-3-(N-methyl-piperidyl-4')-2, 3-dihydro-thionaphthene, 2-methyl-2-(p-chlorophenyl)-3-hydroxy-3-(N-methyl-piperidyl-4')-2,3-dihydro-thionaphthene,
2-methyl-2-(m-chlorophenyl)-3-hydroxy-3-(N-methyl-piperidyl-4')-2,3-dihydro-thionaphthene,
6-chloro-2,4-dimethyl-2-phenyl-3-hydroxy-3-(N-methyl-piperidyl-4')-2,3-dihydro-thionaphthene, and
6-ethoxy-2-methyl-2-phenyl-3-hydroxy-3-(N-methyl-piperidyl-4')-2,3-dihydro-thionaphthene.

EXAMPLE 12

34 g. 3-hydroxy-2-methyl-3-(N-methyl-piperidyl-4')-2-phenyl-2,3-dihydro-thionaphthene, α-racemate (M.P. 208–210° C.) or β-racemate, or mixtures of both racemates, are dissolved in 200 ml. isopropanol; and 40% aqueous hydrobromic acid is added to obtain a pH of 1–2. The mixture is boiled for 4 hours, cooled, and allowed to crystallize overnight. The product is removed by suction, washed with isopropanol and with ether, and recrystallized from ethanol. There are obtained 32 g. 2-methyl-3-(N-methyl-piperidylidene-4')-2-phenyl-2,3-dihydro - thionaphthene-hydrobromide, M.P. 248–252° C. Hydrochloride, M.P. 255–256° C.

EXAMPLE 13

33.5 g. 2 - methyl-2-phenyl-indanone-(1) are reacted with Grignard reagent of 5.43 g. magnesium and 40 g. N-n-butyl - 4 - chloropiperidine (B.P. 139–146° C./100 mm.), as in Example 1. The two stereo-isomeric racemates of 1-(N-n-butyl-piperidyl-4')-1-hydroxy-2-methyl-2-phenyl-indane (19 g.) are obtained as basic ether residues ($R_F$ 0.6 and 0.75).

19 g. of the crude base are dissolved in 30 ml. 15% isopropanolic hydrochloric acid; the solution is adjusted to a pH of 1 and boiled for 1 hour. The base is isolated in a conventional manner. There are obtained 17 g. 1-(N-n-butyl-piperidylidene-4')-2-methyl-2-phenyl-indane, B.P. 190–198° C./0.05 mm.; hydrobromide, M.P. 231–232° C. (isopropanol/water).

EXAMPLE 14

44.4 g. 2-methyl-2-phenyl-indanone-(1) are reacted as in Example 1 with a Grignard reagent of 83.7 g. N-benzyl-4-chloropiperidine (B.P. 153–157° C./10 mm.) and 9.74 g. magnesium. The distillation of the basic ether residue produces 70 g. of a mixture of the stereo-isomeric racemates of 1-(N-benzyl-piperidyl-4')-1-hydroxy-2-methyl-2-phenyl-indane (B.P. 235–250° C./0.1 mm.); from this mixture, there are obtained after recrystallization from methanol 51 g. pure α-racemate, M.P. 83–84° C. The mother liquor contains, in addition to the α-racemate, the enriched β-racemate, $R_F$ 0.6 and 0.85, respectively.

Analogously, the following compounds can be obtained:

From 127 g. 2-phenyl-tetralone-(1), 180 g. N-benzyl-4-chloropiperidine, and 20.5 g. magnesium: 80 g. of a crude mixture of the stereo-isomeric racemates of 1-(N-benzyl-piperidyl-4')-1-hydroxy-2 - phenyl - tetralin. From the solution of this mixture in ethanol, the acid oxalate of the α-racemate of 1-(N-benzyl-piperidyl-4')-1-hydroxy-2-phenyl-tetralin is obtained by means of oxalic acid; M.P. 177–179° C. (from ethanol/ether).

Analogously, the following compounds are obtainable from the corresponding 2-aryl-tetralones-(1):

1-(N-benzyl-piperidyl-4')-2-(o-fluorophenyl)-1-hydroxy-tetralin
1-(N-benzyl-piperidyl-4')-2-(o-tolyl)-1-hydroxy-tetralin
1-(N-benzyl-piperidyl-4')-2-(p-methoxyphenyl)-1-hydroxy-tetralin
1-(N-benzyl-piperidyl-4')-2-phenyl-5-fluoro-1-hydroxy-tetralin.

EXAMPLE 15

5.2 g. of the α-racemate of 1-(N-benzyl-piperidyl-4')-2-methyl-2-phenyl-indanol-(1) are dissolved in 35 ml. isopropanol, and 40% aqueous hydrobromic acid is added to obtain a pH of 1. After boiling for 1 hour, 30 ml. water are added, and the crystallized 1-(N-benzyl-piperidylidene-4')-2-methyl-2-phenyl-indane-hydrobromide (5 g.) is removed by suction; M.P. 219–220° C. (from acetone).

Analogously, there is obtained, from 1-(N-benzyl-piperidyl-4')-1-hydroxy-2-phenyl-tetralin (α-racemate, from the acid oxalate), 1-(N-benzyl-piperidyl-4')-2-phenyl-3,4-dihydronaphthalene-hydrobromide, with 90% yield, M.P. 252–254° C.

In place of the pure stereo-isomeric α-racemates, it is also possible to use the crude base mixtures obtainable according to Example 14 for dehydrating purposes; in this manner, there are obtained 1-(N-benzyl-piperidylidene-4')-2-methyl-2-phenyl-indane, and 1-(N-benzyl-piperidyl-4')-2-phenyl-3,4-dihydronaphthalene, respectively, or their hydrobromides, in yields of 70–80%.

EXAMPLE 16

12.6 g. of the acid oxalate of the α-racemate of 1-(N-benzyl-piperidyl-4')-1-hydroxy-2-phenyl-tetralin are dissolved in 200 ml. methanol and shaken with 10 g. palladium black under a hydrogen pressure of 6 atmospheres and at 20° C. After 2 hours, the hydrogenation is terminated. The mixture is removed from the catalyst by filtration, and the filtrate is concentrated to dryness. The residue ($R_F$ 0.1) is dissolved in 2 N acetic acid, and excess sodium chloride solution is added. There are obtained 8 g. 1-hydroxy-1-(piperidyl-4')-2-phenyl-tetralin-hydrochloride, M.P. 262–263° C.

Analogously, 1-(piperidyl - 4') - 2 - methyl - 2 - phenyl-indanole-(1) ($R_F$ 0.15) can be produced by catalytic debenzylation of 1-(N-benzyl-piperidyl-4')-2-methyl-2-phenyl-indanole-(1) (α-racemate).

It is also possible to use the crude base mixtures in place of the α-racemates; thus, the racemate mixtures of 1-hydroxy - 1 - (piperidyl - 4') - 2 - phenyl - tetralin; of 1-(piperidyl-4')-2-methyl-2-phenyl-indanole-(1); of 1-hydroxy-1-(piperidyl-4')-2-(o-tolyl)-tetralin; of 2-(o-fluorophenyl)-1-hydroxy-1-(piperidyl-4')-tetralin; of 1-hydroxy-2-methyl-1-(piperidyl-4')-2-phenyl-tetralin; or of 1-hydroxy-5-methyl-1 - (piperidyl - 4') - 2 - phenyl-tetralin are obtained.

EXAMPLE 17

(a) 5.5 g. 1-hydroxy-1-(piperidyl-4')-2-phenyl-tetralin-hydrochloride are dehydrated as in Example 2. There are obtained 5 g. 1-(piperidyl-4')-2-phenyl-3,4-dihydronaphthalene-hydrochloride, M.P. 274–276° C. (from isopropanolether). Free base, M.P. 94–96° C. (from diisopropylether).

(b) The processes described in Examples 16 and 17(a) can be conducted without isolating the carbinol intermediate: The filtrate of the hydrogenation catalyst in Example 16 is mixed with concentrated hydrochloric acid until a pH of 1 is reached, and is boiled for 3 hours. The methanol is distilled off, and the aqueous phase is worked up in the usual manner. There is obtained 1-(piperidyl-4')-2-phenyl-3,4-dihydronaphthalene, M.P. 94–96° C.

Analogously, the following compounds are obtainable from the corresponding N-benzyl-carbinols:

1-(piperidyl-4')-2-(o-tolyl)-3,4-dihydronaphthalene
2-(p-methoxyphenyl)-1-(piperidyl-4')-3,4-dihydronaphthalene
5-fluoro-1-(piperidyl-4')-2-phenyl-3,4-dihydronaphthalene
5-methyl-1-(piperidyl-4')-2-phenyl-3,4-dihydronaphthalene

EXAMPLE 18

1 g. 1-(piperidyl-4')-2-phenyl-3,4-dihydronaphthalene is heated for 1 hour to 70° C. with 0.33 g. formic acid and 0.34 g. 40% aqueous formalin solution. The cooled reaction mixture is mixed with dilute caustic soda solution and shaken out with ether. The ether phase is dried, and the ether is distilled off. There is obtained 0.8 g. 1-(N-methyl-piperidyl-4')-2-phenyl-3,4-dihydronaphthalene, M.P. 117–119° C. (from ethanol/water); hydrochloride: M.P. 258–262° C.

Analogously, 1-(N-methyl-piperidylidene-4')-2-methyl-2-phenyl-indane and its hydrochloride, respectively, are obtained from 1-(piperidylidene-4')-2-methyl-2-phenyl-indane.

EXAMPLE 19

2.9 g. 1-(piperidyl-4')-2-phenyl-3,4-dihydronaphthalene are boiled for 14 hours in 30 ml. benzene with 10 g. ethyl bromide. The cooled mixture is shaken with aqueous ammonia solution; the benzene phase is separated and concentrated by evaporation.

The residue is heated for 2 hours to 80° C. with 10 ml. acetic acid anhydride; then, the residue is mixed with cold water and dilute sulfuric acid and shaken out with ether. The acidic aqueous phase is made alkaline by means of solution hydroxide and shaken out with ether. The ether phase is dried, and the ether is distilled off. The residue is dissolved in 10 ml. 1 N hydrochloric acid, and 1-(N-ethyl-piperidyl-4')-2 - phenyl - 3,4 - dihydronaphthalene-hydrochloride is recrystallized from water. Yield: 2.5 g., M.P. 277–278° C.

Analogously, the following compounds can be produced:

From 2.9 g. (1-piperidyl-4')-2-phenyl-3,4-dihydronaphthalene and 3 g. benzyl bromide: 2.1 g. 1-(N-benzyl-piperidyl-4')-2-phenyl-3,4-dihydronaphthalene;

From 5.5 g. 2-methyl-1-(piperidylidene-4')-2-phenyl-indane and 10 g. n-butyl bromide: 4.8 g. 1-(N-n-butyl-piperidylidene-4')-2-methyl-2-phenyl-indane.

EXAMPLE 20

14.3 g. 1 - (N - methyl - piperidylidene - 4') - 2-methyl-2-phenyl-indane are dissolved in 50 ml. absolute benzene; 16.3 g. chloro-formic acid ethyl ester are added slowly, drop by drop, and the mixture is further heated for 1½ hours to 40–50° C. Thereafter, the mixture is agitated with 50 ml. 2 N sulfuric acid; the benzene phase is separated, is briefly dried over sodium sulfate, and concentrated by evaporation. The thus-obtained 1-(N-carbethoxy-piperidylidene-4')-2-methyl-2-phenyl-indane is mixed with a solution of 8.4 g. potassium hydroxide in 9 ml. water and 60 g. diethylene glycol monoethylether and boiled for 10 hours. The mixture is poured onto 300 ml. water, shaken out with ether, and the ether extract is shaken with 2 N acetic acid; the acetic extract is made alkaline by means of solution of sodium hydroxide. The base is taken up in ether, and the ether is dried over potassium carbonate, filtered, and distilled off. The thus-obtained 1-(piperidylidene-4')-2-methyl-2-phenyl-indane is dissolved in 40 ml. acetone, mixed with 2 N hydrochloric acid to obtain a pH of 1, diluted with 250 ml. water, and 5 g. sodium nitrate are added to the solution at boiling temperature. During cooling, 12 g. 1-(piperidylidene-4')-2-methyl-2-phenyl-indane-nitrate crystallize, M.P. 188–189° C. (decomposition).

Analogously, the following compounds are obtained.

From 33 g. 1-(N-methyl-piperidyl-4')-2-phenyl-3,4-dihydronaphthalene: 25 g. 1-(piperidyl-4')-2-phenyl-3,4-dihydronaphthalene, M.P. 94–96° C.; hydrochloride, M.P. 273–275° C. (from isopropanol);

From 1.3 g. 1-(N-n-butyl-piperidyl-4')-2-methyl-2-phenyl-indane: 0.7 g. 1-(piperidyl-4')-2-methyl-2-phenylidane-nitrate, M.P. 188–189° C. (decomposition).

EXAMPLE 21

1.65 g. 1 - (N-benzyl-piperidylidene-4')-2-methyl-2-phenyl-indane are dissolved in 30 ml. absolute benzene, mixed with 1.3 g. chloro-formic acid ethyl ester, and boiled for 3 hours. The solution is concentrated by evaporation and the residue boiled for 3 hours in 10 g. glacial acetic acid and 5 g. 48% aqueous hydrobromic acid. The working-up operation which is carried out in the usual manner results in 1.1 g. of a resin. From the solution of this resin in acetone/hydrochloric acid with sodium nitrate, 0.9 g. 1 - (piperidylidene-4') - 2 - methyl-2-phenyl-indane-nitrate, M.P. 187–188° C. (decomposition) is obtained.

EXAMPLE 22

5 g. 1-(N-methyl-piperidyl-4')-2-phenyl-3,4-dihydronaphthalene are dissolved in 80 ml. ethanol, and 10 g. perhydrol (i.e., 30% $H_2O_2$) are added dropwise under stirring. The solution is allowed to stand for 20 hours at 25° C.; then it is heated for three hours to 60° C. Thereafter, a spatula tipful of platinum oxide is added to the solution, and the mixture is stirred until there is no peroxide present any more in the solution. Subsequently, the mixture is filtered, the filtrate is concentrated by evaporation to about 20 ml., and 1–2 ml. water are added. There crystallize 4.8 g. 1-(N-methyl-piperidyl-4')-2-phenyl-3,4-dihydronaphthalene - N - oxide-hydrate, M.P. 140–144° C.

EXAMPLE 23

27 g. 1-hydroxy-2-methyl-1-(N-methyl-piperidyl-4')-2-phenyl-tetralin are dehydrated by means of 100 ml. 1 N hydrochloric acid, as in Example 3. The basic residue is reacted, analogously to Example 22, with 40 g. perhydrol in 400 ml. ethanol, and the filtered solution is evaporated to dryness. The residue is triturated with 30 ml. acetone and vacuum-filtered. After recrystallization from acetone/water, 22 g. 2-methyl-1-(N-methyl-piperidylidene-4')-2-phenyl-tetralin-N-oxide, semihydrate are obtained, M.P. 227–228° C. (decomposition).

EXAMPLE 24

A solution of 2 g. 1-(N-methyl-piperidyl-4')-2-phenyl-3,4-dihydronaphthalene in 10 ml. benzene is slowly added, dropwise, to a solution of 2 g. bromocyanogen in 10 ml. benzene. The mixture is allowed to stand overnight and is then heated for 2 hours to 60–70° C. The filtered benzene solution is washed with dilute hydrochloric acid and concentrated by evaporation. The residue is boiled for 5 hours with 50 ml. concentrated hydrochloric acid, and the base is isolated in the usual manner. After recrystallization from diisopropylether, 0.9 g. 1-(piperidyl-4')-2-phenyl-3,4-dihydronaphthalene, M.P. 94–96° C., is obtained.

EXAMPLE 25

2 g. 1-(piperidyl-4')-2-phenyl-3,4-dihydronaphthalene are hydrogenated in 40 ml. ethanol with 15 ml. acetaldehyde in the presence of Raney nickel, until hydrogen is no longer taken up. The solution is filtered and concentrated by evaporation. The residue is heated for 1 hour with 10 ml. acetic anhydride to 80° C.; then, water and dilute sulfuric acid are added, the residue is shaken out with ether, the base is isolated from the aqueous phase in the usual manner, and this base is converted into the hydrochloride as set forth in Example 19. There are obtained 1.5 g. 1-(N-ethylpiperidyl-4')-2-phenyl-3,4-dihydronaphthalene-hydrochloride, M.P. 277–278° C.

EXAMPLE 26

10 g. 2 - methyl - 3 - (N-methyl-piperidylidene-4')-2-phenyl-2,3-dihydro-thionaphthene are reacted as in Example 20 with chloro-formic acid ethyl ester, and the urethane which is formed is boiled for 30 hours with a mixture of 15 g. sodium hydroxide, 20 ml. water, and 250 ml. methanol. The methanol is distilled off, the aqueous solution is acidified with dilute hydrochloric acid and extracted with ether, and the aqueous phase is worked up in the usual manner to obtain the base. The crude base is dissolved in 10 ml. ethanol; ethereal hydrochloric acid is added, and the precipitated hydrochloride is recrystallized from ethanol. There are obtained 8 g. 2-methyl - 3-(piperidylidene-4')-2-phenyl-2,3-dihydro-thionaphthene-hydrochloride, M.P. 237–238° C.

Analogously, 1 - hydroxyl-1-(piperidyl-4')-2-methyl-2-phenyl-indane is obtained from 1-hydroxy-1(N-methyl-piperidyl-4')-2-methyl-2-phenyl-indane.

EXAMPLE 27

Analogously to Example 1, the following compounds are obtainable from the corresponding 6-aryl-benzosuberones:

5-hydroxy-5-(N-methyl-piperidyl-4')-6-phenyl-benzosuberane 5-hydroxy-5-(N-ethyl-piperidyl-4')-6-phenyl-benzosuberane 5-hydroxy-5-(N-methyl-piperidyl-4')-6-methyl-6-phenyl-benzosuberane 5-hydroxy-5-(N-benzyl-piperidyl-4')-6-phenyl-benzosuberane 5-hydroxy-5-(N-methyl-piperidyl-4')-6-(m-chlorophenyl)-benzosuberane 5-hydroxy-5-(N-methyl-piperidyl-4')-6-(o-tolyl)-benzosuberane 1-chloro-5-hydroxy-5-(N-methyl-piperidyl-4')-6-phenyl-benzosuberane 3-bromo-5-hydroxy-5-(N-methyl-piperidyl-4)'-6-phenyl-benzosuberane 1-methyl-5-hydroxy-5-(N-methyl-piperidyl-4')-6-(o-chlorophenyl)-benzosuberane 2-chloro-5-hydroxy-5-(N-methyl-piperidyl-4')-6-methyl-6-(o-tolyl)-benzosuberane.

EXAMPLE 28

By catalytic debenzylation analogously to Example 16, the following compounds are obtainable from the corresponding N-benzyl compounds:

5-hydroxy-5-(piperidyl-4')-6-phenyl-benzosuberane 1-hydroxy-2-methyl-1-(piperidyl-4')-2-(o-tolyl)-indane

EXAMPLE 29

Analogously to Examples 1 and 4, the following compounds are obtainable from the corresponding 6-aryl-benzosuberones:

5-(N-methyl-piperidyl-4')-6-phenyl-5,6-dehydro-benzosuberane 5-(N-ethyl-piperidyl-4')-6-phenyl-5,6-dehydro-benzosuberane 5-(N-butyl-piperidyl-4')-6-phenyl-5,6-dehydro-benzosuberane 5-(N-benzyl-piperidyl-4')-6-phenyl-5,6-dehydro-benzosuberane 6-methyl-5-(N-methyl-piperidylidene-4')-6-phenyl-benzosuberane 6-methyl-5-(N-ethyl-piperidylidene-4')-6-phenyl-benzosuberane 6-methyl-5-(N-butyl-piperidylidene-4')-6-phenyl-benzosuberane 6-methyl-5-(N-benzyl-piperidylidene-4')-6-phenyl-benzosuberane 6-ethyl-5-(N-methyl-piperidylidene-4')-6-phenyl-benzosuberane 6-(o-chlorophenyl)-5-(N-methyl-piperidyl-4')-5,6-dehydro-benzosuberane 6-(m-chlorophenyl)-5-(N-methyl-piperidyl-4')-5,6-dehydro-benzosuberane 6-(p-chlorophenyl)-5-(N-methyl-piperidyl-4')-5,6-dehydro-benzosuberane 6-(p-bromophenyl)-5-(N-methyl-piperidyl-4')-5,6-dehydro-benzosuberane 6-(p-methoxyphenyl)-5-(N-methyl-piperidyl-4')-5,6-dehydro-benzosuberane 6-(p-methylmercaptophenyl)-5-(N-methyl-piperidyl-4')-5-6-dehydro-benzosuberane 6-(o-tolyl)-5-(N-methyl-piperidyl-4')-5,6-dehydro-benzosuberane 6-(m-tolyl)-5-(N-methyl-piperidyl-4')-5,6-dehydro-benzosuberane 6-(p-tolyl)-5-(N-methyl-piperidyl-4')-5,6-dehydro-benzosuberane 6-(o-tolyl)-5-(N-benzyl-piperidyl-4')-5,6-dehydro-benzosuberane 6-(p-tolyl)-5-(N-benzyl-piperidyl-4')-5,6-dehydro-
benzosuberane
1-chloro-5-(N-methyl-piperidyl-4')-6-phenyl-5,6-
dehydro-benzosuberane
3-chloro-5-(N-methyl-piperidyl-4')-6-phenyl-5,6-
dehydro-benzosuberane
3-bromo-5-(N-methyl-piperidyl-4')-6-phenyl-5,6-
dehydro-benzosuberane
1-methyl-5-(N-methyl-piperidyl-4')-6-phenyl-5,6-
dehydro-benzosuberane
3-methyl-5-(N-methyl-piperidyl-4')-6-phenyl-5,6-
dehydro-benzosuberane
3-isopropyl-5-(N-methyl-piperidyl-4')-6-phenyl-
5,6-dehydro-benzosuberane
2-ethoxy-3-methoxy-5-(N-methyl-piperidyl-4')-6-
phenyl-5,6-dehydro-benzosuberane
1-ethoxy-5-(N-methyl-piperidyl-4')-6-phenyl-5,6-
dehydro-benzosuberane
2,3-dimethoxy-5-(N-methyl-piperidyl-4')-6-phenyl-
5,6-dehydro-benzosuberane
1-methoxy-5-(N-methyl-piperidyl-4')-6-phenyl-5,6-
dehydro-benzosuberane
3-methoxy-5-(N-methyl-piperidyl-4')-6-phenyl-5,6-
dehydro-benzosuberane
2,3-methylenedioxy-5-(N-methyl-piperidyl-4')-6-
phenyl-5,6-dehydro-benzosuberane
3-bromo-6-methyl-5-(N-methyl-piperidylidene-4')-
6-phenyl-benzosuberane
6-(o-chlorophenyl)-6-methyl-5-(N-methyl-piperidyl-
idene-4')-benzosuberane
1-chloro-6-(p-methoxyphenyl)-6-methyl-5-(N-methyl-
piperidylidene-4')-benzosuberane
6-methyl-5-(N-benzyl-piperidylidene-4')-6-phenyl-
benzosuberane
6-ethyl-5-(N-benzyl-piperidylidene-4')-6-phenyl-
benzosuberane

EXAMPLE 30

Analogously to Examples 6 and 7, the following compounds can be obtained from the corresponding 2-aryl-indanones-(1):

1-(N-ethyl-piperidylidene-4')-2-methyl-2-phenyl-indane
1-(N-benzyl-piperidylidene-4')-2-methyl-2-phenyl-
indane
1-(N-benzyl-piperidylidene-4')-2-methyl-2-(p-
methoxyphenyl)-indane
1-(N-methyl-piperidylidene-4')-2-methyl-2-(o-chloro-
phenyl)-indane
1-(N-methyl-piperidylidene-4')-2-methyl-2-(m-chloro-
phenyl)-indane
2-methyl-1-(N-propyl-piperidylidene-4')-2-phenyl-
indane
2-ethyl-6-bromo-1-(N-methyl-piperidylidene-4'-2-
phenyl-indane
1-(N-ethyl-piperidylidene-4')-4-chloro-2-(o-chloro-
phenyl)-indane

EXAMPLE 31

Analogously to Examples 11 and 12, the following compounds can be obtained from the corresponding 2-aryl-2,3-dihydro-thionaphthenones-(3):

3-(N-ethyl-piperidylidene-4')-2-methyl-2-phenyl-2,3-
dihydrothionaphthene
3-(N-methyl-piperidylidene-4')-2-ethyl-2-phenyl-2,3-
dihydrothionaphthene
3-(N-methyl-piperidylidene-4')-2-methyl-2-(o-chloro-
phenyl)-2,3-dihydro-thionaphthene
3-(N-methyl-piperidylidene-4')-2-methyl-2-(p-methoxy-
phenyl)-2,3-dihydro-thionaphthene
6-chloro-3-(N-methyl-piperidylidene-4')-2,3-dimethyl-
2-phenyl-2,3-dihydro-thionaphthene
6-ethoxy-3-(N-methyl-piperidylidene-4')-2-methyl-2-
phenyl-2,3-dihydro-thionaphthene
3-(N-n-propyl-piperidylidene-4')-2-methyl-2-phenyl-
2.3-dihydro-thionaphthene
3-(N-n-butyl-piperidylidene-4')-2-methyl-2-phenyl-
2,3-dihydro-thionaphthene
3-(N-methyl-piperidylidene-4')-2-methyl-2-(o-tolyl)-
2,3-dihydro-thionaphthene
3-(N-methyl-piperidylidene-4')-2-methyl-2-(m-tolyl)-
2,3-dihydro-thionaphthene
3-(N-methyl-piperidylidene-4')-2-methyl-2-(p-tolyl)-
2,3-dihydro-thionaphthene
3-(N-ethyl-piperidylidene-4')-2-methyl-2-(o-tolyl)-
2,3-dihydro-thionaphthene
5-chloro-2,7-dimethyl-1-(N-methyl-piperidylidene-4')-2-
phenyl-2,3-dihydro-thionaphthene
6-chloro-2-methyl-1-(N-methyl-piperidylidene-4')-2-
phenyl-2,3-dihydro-thionaphthene
6-methoxy-2-methyl-1-(N-methyl-piperidylidene-4')-2-
phenyl-2,3-dihydro-thionaphthene
5-bromo-2-methyl-1-(N-methyl-piperidylidene-4')-2-
phenyl-2,3-dihydro-thionaphthene.

EXAMPLE 32

By catalytic debenzylation analogously to Example 16, and dehydration analogously to Example 17, the following compounds are obtainable from the corresponding N-benzyl compounds:

2-methyl-1-(piperidylidene-4')-2-phenyl-indane
2-methyl-1-(piperidylidene-4')-2-phenyl-tetralin
2-ethyl-1-(piperidylidene-4')-2-phenyl-tetralin
6-methyl-5-(piperidylidene-4')-6-phenyl-benzosuberane
6-ethyl-5-(piperidylidene-4')-6-phenyl-benzosuberane
2-(p-methoxyphenyl)-2-methyl-1-(piperidylidene-4')-
indane.

EXAMPLE 33

The following salts of 1-(N-methyl-piperidyl-4')-2-phenyl-3,4-dihydronaphthalene are obtained by adding an excess amount of the corresponding acid to a solution of the base in isopropanol:

Hydrochloride, M.P. 258–262° C. (from isopropanol);
Hydrobromide, M.P. 270–272° C. (from ethanol);
Acid phosphate-monohydrate, M.P. 227–235° C. (sintering starting at 180° C., from water);
Acid sulfate, M.P. 180–182° C. (from isopropanol);
Acid citrate-hydrate, M.P. 95–99° C. (decomposition; sintering starting at 85° C., from isopropanol);
Acid tartrate, M.P. 176–177° C. (from isopropanol).

The following examples are such for pharmaceutical preparations.

I. *Tablets*

Each tablet contains:

|  | Mg. |
|---|---|
| 1-(N-methyl-piperidyl-4')-2 - phenyl - 3,4 - dihydro-naphthalene hydrochloride | 20 |
| Lactose | 150 |
| Corn starch | 20 |
| Talc | 8 |
| Magnesium stearate | 2 |

II. *Coated tablets*

Each coated tablet contains:

|  |  |
|---|---|
| 1-(N-butyl-piperidylidene-4')-2 - methyl - 2 - phenyl-indane hydrochloride | 12 |
| Lactose | 120 |
| Corn starch | 12 |
| Talc | 6 | and additionally a coating consisting of a mixture of corn starch, sugar, talc, and tragacanth.

III. *Injection solution*

Each ampoule contains a solution of 1 mg. of 2-methyl-2-phenyl-3-(N-methyl-piperidylidene-4') - 2,3 - dihydro-thionaphthene hydrobromide in 5 ml. of distilled water.

IV. Drops 2.5 g. each of methyl and propyl p-hydroxybenzoate are dissolved in 5 l. of hot distilled water. After cooling, 1 g. of saccharin sodium salt and 50 g. of 2-methyl-2-phenyl-3-(N-methyl-piperidylidene-4')-2,3-dihydro - thionaphthene hydrochloride are added. The solution is filled into appropriate bottles. The average dosage to be administered is 20 drops (about 10 mg. of the active ingredient).

The potentiating effect of some of the new compounds on the hexobarbital narcosis was determined as follows:

Female rats (weight 130 to 280 g.) are treated orally with varied dosages of the test substances suspended in a 5 percent aqueous solution of arabic gum. An identical number of animals (control group) is simultaneously treated orally with a 5 percent solution or arabic gum only. 45 minutes later, all animals are given 20 mg./kg. of hexobarbital sodium intravenously. The duration of narcosis is determined by two criteria (head rising and turning from back to prone position). The minimal efficient dosage of the test compounds is defined as the lowest dosage which produces a significant difference of narcosis duration compared with that observed in the control group. The following ratios of activity were obtained by comparing the minimal efficient dosages of the test compounds to that of meprobamate (activity=1):

| | |
|---|---|
| 2 - methyl - 3-(N-methyl-piperidylidene-4')-2-phenyl-2,3-dihydro-thionaphthene | 10 |
| 1 - (N-butyl-piperidylidene-4') - 2 - methyl-2-phenyl-indane | 7.5 |
| 1 - hydroxy - 1 - (N - methyl-piperidyl-4')-2-phenyl-tetralin | 4 |
| 1 - hydroxy - 1 - (N - benzyl - piperidyl-4')-2-phenyl-tetralin | 3 |
| 1 - (N - methyl - piperidyl - 4') - 2 - phenyl - 3,4 - dihydro-naphthalene | 2 |
| 2 - methyl - 2 - phenyl - 3 - (piperidylidene - 4') - 2,3 - dihydro-thionaphthene | 2 |
| 2 - methyl - 1 - (N - methyl - piperidylidene - 4') - 2 - phenyl - indane | 1.5 |

By repeating the preceding examples, using the required starting materials, all of the specifically and generically described compounds can be produced. The reaction conditions can, of course, be routinely varied by those skilled in the art to give more weight to certain variables of the process, such as reaction time, inhibition of side reactions, yield, and so on.

From the foregoing description, one skilled in the art can easily ascertain the essential characteristics of this invention, and without departing from the spirit and scope thereof can make various changes and modifications of the invention to adapt it to various usages and conditions. Consequently, such changes and modifications are properly, equitably, and intended to be, within the full range of equivalence of the following claims.

What is claimed is:
1. A member selected from the group consisting of:
(A) a compound of the formula

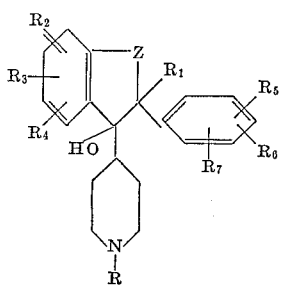

(B) a compound of the formula

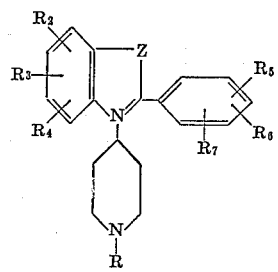

IV (C) a compound of the formula

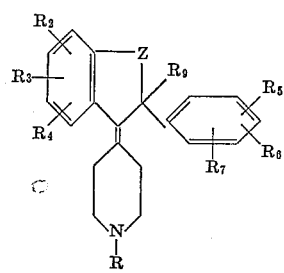

V (D) physiologically acceptable acid addition salts thereof;
(E) quaternary ammonium salts thereof; and
(F) N-oxides thereof;
wherein
Z is selected from the group consisting of sulfur and $(-CH_2-)_n$, $n$ being an integer from two to three, inclusive with respect to formula (B), and one to three, inclusive with respect to formulae (A) and (C);
R and $R_1$ are each selected from the group consisting of hydrogen, alkyl of 1–4 carbon atoms, and benzyl;
$R_2$, $R_3$, $R_4$, $R_5$, $R_6$, and $R_7$ are each selected from the group consisting of hydrogen, alkyl of 1–4 carbon atoms, alkoxy of 1–4 carbon atoms, alkylthio of 1–4 carbon atoms, trifluoromethyl, fluorine, chlorine, bromine, and two adjacent radicals of $R_2$ through $R_7$ on one ring being represented by methylene dioxy;
$R_9$ is selected from the group consisting of alkyl of 1–4 carbon atoms and benzyl, with the provisions that:
(1) at least three of $R_2$ through $R_7$ represent hydrogen, and
(2) not more than four of $R_2$ through $R_7$ represent a halogen.

2. 1 - (N - methyl - piperidyl - 4') - 2-phenyl-3,4-dihydronaphthalene.

3. 2 - methyl - 3 - (N - methyl - piperidylidene - 4')-2-phenyl - 2,3 - dihydro - thionaphthene.

4. 2 - methyl - 1 -(N - methyl - piperidylidene - 4')-2-phenyl-indane.

5. 1 - (N - butyl - piperidylidene - 4') - 2 - methyl - 2-phenyl - indane.

6. 1 - hydroxy - 1 - (N - methyl - piperidyl - 4') - 2-phenyltetralin.

7. 1 - hydroxy - 1 - (N - benzyl - piperidyl - 4') - 2-phenyltetralin.

8. 2 - methyl - 2 - phenyl - 3 - (piperidylidene - 4') - 2,3-dihydro - thionaphthene.

(References on following page)

References Cited

UNITED STATES PATENTS

| | | | |
|---|---|---|---|
| 1,915,334 | 6/1933 | Salzberg et al. | 260—293.45 |
| 2,610,183 | 9/1952 | McKellin et al. | 260—293.45 |
| 2,794,048 | 5/1957 | Richter et al. | 260—507.9 |
| 2,854,379 | 9/1958 | Francher | 167—65 |
| 2,890,984 | 6/1959 | Sahyun | 167—65 |
| 2,916,490 | 12/1959 | Schenck et al. | 260—247 |
| 3,159,634 | 12/1964 | Jack et al. | 260—293 |

FOREIGN PATENTS 824,713   1/1959   Great Britain.

WALTER A. MODANCE, *Primary Examiner.*

AVROM D. SPEVACK, *Assistant Examiner.*